United States Patent [19]

Schindler et al.

[11] 3,837,016
[45] Sept. 24, 1974

[54] PLURAL TEMPERATURE LEVEL FLUID HEATING SYSTEM

[75] Inventors: Herbert Schindler, North Hollywood; Willard O. Ware, Stockton, both of Calif.

[73] Assignee: M.M.S. Limited, Alameda, Calif.

[22] Filed: Apr. 11, 1973

[21] Appl. No.: 350,098

[52] U.S. Cl. ............................................. 4/172.17
[51] Int. Cl. ........................... E04h 3/16, E04h 3/18
[58] Field of Search ............. 4/172.15, 172, 172.17, 4/172.18; 210/169; 134/167

[56] References Cited
UNITED STATES PATENTS

| 3,207,133 | 9/1965 | Anderson | 4/172.15 X |
| 3,460,166 | 8/1969 | Weber | 4/172 |
| 3,623,165 | 11/1971 | Whittell, Jr. | 4/172.15 |
| 3,801,992 | 4/1974 | Sable | 4/172.17 |

*Primary Examiner*—Henry K. Artis
*Attorney, Agent, or Firm*—Silverman & Cass

[57] ABSTRACT

Plural temperature level fluid heating system characterized by an improved temperature control system capable of controlling fluid temperature at two different levels, said fluid being heated in a single heater, temperature of the fluid being controlled by a thermostatically operated electrical circuit which responds to a rise in temperature beyond specific set points selectively breaking a series circuit with the heater energizing means to interrupt the fuel supply to the heater.

10 Claims, 1 Drawing Figure

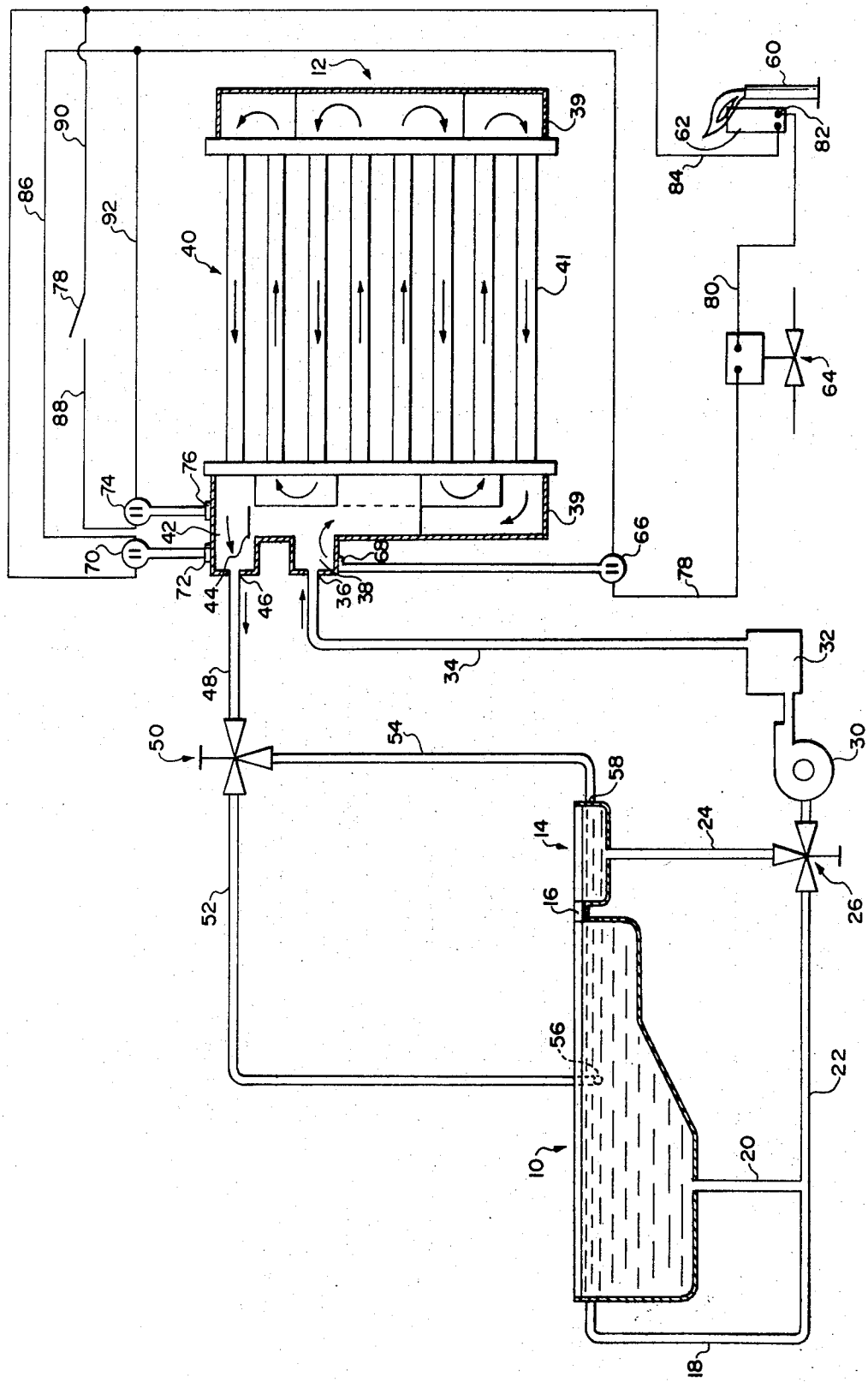

PLURAL TEMPERATURE LEVEL FLUID HEATING SYSTEM

FIELD OF THE INVENTION

This invention relates generally to fluid heating apparatus and more particularly to a temperature control system that is capable of controlling the temperature of heated fluid at two different levels from a single heater apparatus.

BACKGROUND OF THE INVENTION

The invention herein particularly is useful for heating swimming pool water for use in two or more pools heated by a common pool fluid heater, each pool being maintained at a different temperature level. Often swimming pool systems are provided which include a second pool for therapeutic use, such pool being of small capacity and shallow design and is maintained at a higher water temperature than the principal swimming pool.

Heretofore, means for maintaining the temperature control of a heated fluid at two different temperature levels were unduly complex, expensive and not as reliable as desired. In most instances, plural heating appliances were required.

SUMMARY OF THE INVENTION

A temperature control system for a continuous flow flud heater of the type capable of delivering fluid alternatively at two maximum temperature levels, said heater including an inlet for receiving fluid to be heated, heat exchanger means in communication with said inlet and in heat transfer relation with a heated medium, means for heating said medium and means for energizing said heating means, and an outlet in communication with said heat exchanger means for receiving and discharging said heated fluid; said temperature control system comprising:

inlet temperature control means responsive to inlet fluid temperature and operable to de-energize said heating means when the temperature of the inlet fluid is above a predetermined temperature level within a desired range of temperatures;

minimum outlet temperature level control means coupled to said inlet temperature control means and responsive to de-energize said heating means when the temperature of the fluid at the outlet reaches a predetermined temperature level and maximum outlet temperature control means connected in parallel with said mimimum outlet temperature level control means and responsive to a maximum temperature level at the outlet to de-energize said heating means, said maximum temperature control means having means selectively to override said minimum temperature control means so that fluid may be discharged from the outlet without exceeding one or the other of said temperature levels.

BRIEF DESCRIPTION OF THE DRAWING

The single FIGURE is a schematic view of a fluid heating system for heating fluid for two swimming pools, each pool being maintained at a different temperature level and illustrating the temperature control system provided in accordance with the invention.

DESCRIPTION OF THE PREFERRED EMBODIMENTS

Referring to the drawing, a primary swimming pool shall be designated by reference character 10 and has its water supply heated by a gas-fired water heater appliance designated generally by reference character 12. Immediately adjacent the pool 10 is a therapeutic type pool 14. Pool 14 is of small capacity and shallow design and is maintained at usually a higher water temperature than the water in the swimming pool 10. The water for both pools 10 and 14 is supplied by the single heater 12. The pool 14 is in communication with pool 10 by means of an overflow weir 16. The water to be heated is drawn from the pool 10 or the pool 14 through conduit passageways 18 and 20, 22 and 24 respectively. A three-way valve 26 is interposed between the conduit 24 and conduit 28 leading to pump 30. Pump 30 drives the fluid to and through filter means 32 for removal of impurities and debris. From the filter means 32, the fluid is directed by way of conduit 34 to the heater inlet port 36 into the inlet chamber 38. A major fractional portion of the fluid passes through heat exchanger means 40 formed of a plurality of heat exchanger tubes 41 arranged between chambered header means 39 and in heat exchange relation with a heated medium for heating their contents. The heated water passes from the heat exchanger means 40 to enter the outlet chamber 42 where it is mixed with the remaining or diverted portion of the inlet water which passes directly from the inlet chamber 38 to the outlet chamber 42 by way of bypass passage 44. The mixed heated water leaves the heater 12 through the outlet port 46, enters by way of conduit 48 three-way valve 50 to conduit 52 or conduit 54. When heating the pool 10, the valve 50 is positioned to pass heated water through conduit 52 to enter the pool 10 at inlet port 56. The heated water mixes with the relatively large volume of water within the pool 10 slowly to raise the temperature thereof.

The therapeutic pool 14 is heated by directing the heated water through valve to conduit 54. The water enters the pool 14 at inlet port 58 where it then mixes with the relatively small volume of water in the pool 14. Accordingly, the temperature of the water in the therapeutic pool 14 is raised very rapidly.

The water heater 12 is a gas-fired device provided with a pilot burner 60 at which a small amount of gas fuel burns continuously. The heat of the flame of pilot burner 60 generates a small electric current in a pilot generator 62, which is a thermoelectric conversion device.

The operation of the gas burners (not shown) supplying the heat energy to heat the water passing through the heat exchanger of the heater is controlled by a solenoid type gas valve 64 which has its passageway to the main gas burners open when the electrical circuit with the pilot generator is closed. The gas valve 64 responds to an opening of the electrical circuit which will be described by closing and thus shuts off the gas burners. This results in fluid entering the heat exchanger but leaving the same without being heated.

The temperature of the water to be heated is controlled by a series of thermostatically operated switches which respond to a rise in temperature beyond specific set limits by breaking a series electrical circuit controlling the operation of gas valve 64, cutting off gas supply to the heater. Thermostatically operated switch means 66 are positioned at the inlet and controls the operation of the burners by operating the gas valve 64 to close same when the inlet water temperature is between 55°F. and 105°F. The temperature sensing element 68 of thermostatically operated switch means 66 is immersed in the inlet chamber 38. When the water returning from the swimming pool 10 or therapeutic pool 14 reaches an adjusted predetermined temperature which is usually variable throughout the range between 55°F. and 105°F, the switch means 66 opens, closing valve 64. Thermostatic switch means 70 has the temperature sensing element 72 immersed in the outlet chamber 42. When the water mixture being discharged reaches a predetermined temperature, which is preferably 105°F., thermostat switch means 70 open, closing the gas valve 64 to cut off gas supply to the heater. Thermostatically operated switch means 74 also has the temperature sensitive element 76 located at the outlet but opens at a safety maximum temperature, usually 150°F. Switch means 74 are connected in series with independently operated manual switch means 78 but connected in parallel with switch means 70. The manual switch 70 permits an operator to select the upper or the lower limit as the maximum temperature level for the discharged water. Water intended for the swimming pool is heated by setting the switch means 78 to a closed position. As the water temperature is increased beyond the set point of the thermostatically operated switch means 78, the thermostatic element 72 will cause said switch means 78 to open at 105°F, but will not shut off the gas supply because the thermostatically operated switch means 74 remains closed, providing a closed circuit until the water temperature should reach a temperature greater than the set point of thermostatic element 76, namely about 150°F, the upper limit for safety. Water between 105°F and 150°F. is desirable because of the dilution effect since a large body of water is utilized in pool 10.

When heating the therapeutic pool 14, the manual switch 78 can be set to its open position. As the water temperature increases beyond the set point of thermostatic element 72, thermostatically operated switch means 70 will open at 105°F, and will open the fuel supply control circuit shutting off the fuel supply to the heater 12 and thus assuring that water no hotter than 150°F will be introduced into pool 14.

Referring to the drawing, the control circuit for the pool water temperature comprises thermostatically operated switch means 66 having the temperature sensing thermostatic element 68 in the inlet chamber 38. Thermostatic element 68 is set to respond to a predetermined temperature between 55°F and 105°F so as to maintain the maximum temperature of the pools 10 and 14 at a level selected between 55°F and 105°F. Lead 78 couples the switch means to the solenoid operated gas valve 64. Lead 80 connects the solenoid operated gas valve means 64 to the terminal 82 of pilot generator 62. Lead 84 connects the other generator terminal to the thermostatically operated switch means 70, with lead 86 completing the electrical circuit back to switch means 66. Thermostatically operated switch means 74 are connected in series with manual switch means 78 by lead 88 but in parallel relation to switch means 70 by leads 90, 92.

The circuit arrangement illustrated provides temperature control means capable of shutting the gas burners off when the water temperature leaving the heater should reach a temperature in excess of 150°F, which temperature is the recognized limit above which continued operation of the heater would be unsafe. Thus, simple control means can be provided also to shut off the gas burners if, when heating a therapeutic pool, the water temperature of the water leaving the heater should reach a temperature in excess of 105°F, which temperature is the limit at which continued exposure to the user of the therapeutic pool could become a hazard to health. No heating is performed while the inlet water is at a temperature equal or greater than a predetermined selected level between 55°F and 105°F, said selection being made by appropriate selection of the thermostatic element 68.

What we claim is:

1. A temperature control system for a continuous flow fluid heater of the type which includes an inlet for receiving fluid to be heated, heat exchanger means in communication with said inlet and in heat transfer relation with a heated medium, means for heating said medium and means for energizing said heating means, and an outlet in communication with said heat exchanger means for receiving and discharging said heated fluid; said temperature control system comprising:

inlet temperature control means at the inlet responsive to inlet fluid temperature and operable to de-energize said heating means when the temperature of the inlet fluid is above a predetermined temperature of the inlet fluid is above a predetermined temperature level within a desired range of temperatures;

minimum outlet temperature level control means at the outlet and coupled to said inlet temperature control means and responsive to a certain temperature of the fluid at the outlet to de-energize said heating means when the temperature of the fluid at the outlet reaches a predetermined temperature level and maximum outlet temperature control means at the outlet and connected in parallel with said minimum outlet temperature level control means and responsive to a maximum temperature level at the outlet to de-energize said heating means, said maximum temperature control means having means selectively to override said minimum temperature control means so that fluid may be discharged from the outlet without exceeding one or the other of said temperature levels alternatively.

2. The temperature control system as claimed in claim 1 in which each of said temperature control means comprises thermostatically controlled switch means.

3. The temperature control system as claimed in claim 1 in which said inlet temperature control means comprises first thermostatically operated switch means having a temperature sensing element disposed in said inlet and said switch means being connected in a series electrical circuit with said energizing means, said energizing means being electrically operated, said sensing element being operable on said first switch means to de-energize said energizing means when the inlet fluid temperature exceeds a predetermined temperature level to permit passage of said fluid through said heat exchanger and discharge of same from said outlet in unheated condition if the fluid at the inlet has already reached said predetermined temperature level.

4. The temperature control system as claimed in claim 3 in which said minimum outlet control means comprises second thermostatically operated switch means in series with said first thermostatically operated switch means, said second switch means having its thermostatic temperature sensing element disposed within said outlet and being responsive to open said electrical circuit at a predetermined minimum temperature level at the outlet.

5. The temperature control system as claimed in claim 4 in which said maximum outlet temperature control means comprises third thermostatically operated switch means arranged in parallel electrical relationship with said second switch means and override switch means in series with said third switch means, closing thereof maintaining said electrical circuit closed notwithstanding opening of said second switch means, said third switch means having its temperature sensing element disposed within said outlet and responsive to a maximum temperature level at the outlet.

6. The temperature control system as claimed in claim 5 in which said override switch means comprises a selectively operated switch.

7. The temperature control means system as claimed in claim 6 in which said switch is manually operable.

8. A multiple pool fluid heating system capable of providing heated fluid for at least two pools of fluid to maintain said pools at different relative temperature levels from a single fluid heater; comprising, a fluid heater having an inlet and outlet, heat exchanger means coupled between said inlet and outlet, means for supplying heat to the exterior of said heat exchanger and means for energizing said heating means, conduit means coupling the pair of pools to said fluid heater, inlet temperature control means connected in series electrical circuit with said energizing means and operable at a selected temperature level within a temperature level range, first and second outlet temperature level control means at the outlet, said first control means serially connected with said energizing means and operable at a selected minimum discharge temperature to de-energize said heating means and second control means operable at a selected maximum discharge temperature to de-energize said heating means and switch means for selectively coupling said second control means into parallel electrical circuit relationship with said first control means but in series circuit with said inlet temperature control means whereby to override said first control means when so coupled.

9. The system as claimed in claim 8 in which said inlet temperature control means and said first and second control means comprise thermostatically controlled switch means.

10. The system as claimed in claim 8 in which said selectively coupling means comprises switch means and said inlet temperature control means and said first and second control means is temperature responsive.

* * * * *

UNITED STATES PATENT OFFICE
CERTIFICATE OF CORRECTION

Patent No. 3,837,016      Dated September 24, 1974

Inventor(s) HERBERT SCHINDLER and WILLARD O. WARE

It is certified that error appears in the above-identified patent and that said Letters Patent are hereby corrected as shown below:

Column 1, line 31 "flud" should be --fluid--; Column 3, line 1 "controls" should be --control--; Column 3, line 46 "150°F" should be --105°F--; Column 4, lines 29-30, delete "of the inlet fluid is above a predetermined temperature".

Signed and sealed this 31st day of December 1974.

(SEAL)
Attest:

McCOY M. GIBSON JR.      C. MARSHALL DANN
Attesting Officer      Commissioner of Patents